Figure 1:
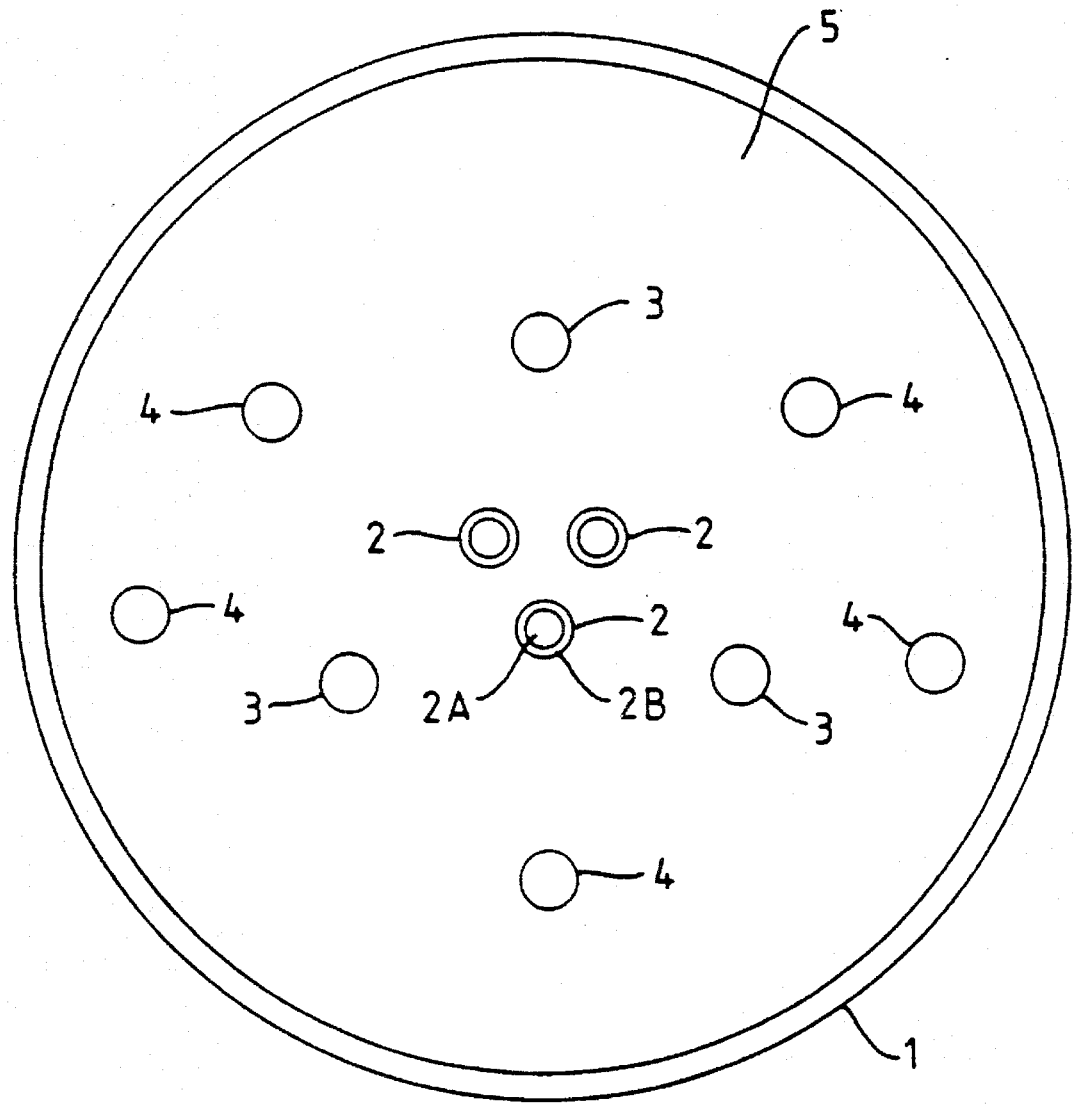

United States Patent [19]
Mole et al.

[11] Patent Number: 5,531,169
[45] Date of Patent: Jul. 2, 1996

[54] TREATMENT OF LIQUID WASTE MATERIAL

[75] Inventors: James Mole, Chesire, United Kingdom; Philippe Queille, Jouy-en-Josas, France; Guillermo Garrido, Sao Paulo, Brazil

[73] Assignees: Imperial Chemical Industries PLC, London, United Kingdom; L'Air Liquide, Societe Anonyme pour l'Etude et l'Exploitation des Procedes Georges Claude, Paris, France

[21] Appl. No.: 256,048

[22] PCT Filed: Dec. 16, 1992

[86] PCT No.: PCT/GB92/02330

§ 371 Date: Sep. 12, 1994

§ 102(e) Date: Sep. 12, 1994

[87] PCT Pub. No.: WO93/13362

PCT Pub. Date: Jul. 8, 1993

[30] Foreign Application Priority Data

Dec. 20, 1991 [GB] United Kingdom ............... 9127096

[51] Int. Cl.⁶ .................................................. F23G 7/00
[52] U.S. Cl. ........................... 110/346; 110/238; 110/260
[58] Field of Search ................................ 110/342, 346, 110/348, 236, 237, 238, 265, 251, 252, 253, 260, 104 B

[56] References Cited

U.S. PATENT DOCUMENTS

| | | | |
|---|---|---|---|
| 3,822,654 | 7/1974 | Ghelfi | 110/260 |
| 4,748,919 | 6/1988 | Campobenedetto et al. | 110/347 |
| 4,890,562 | 1/1990 | Gitman | 110/236 |

*Primary Examiner*—Henry A. Bennett
*Assistant Examiner*—Susanne C. Tinker
*Attorney, Agent, or Firm*—Quarles & Brady

[57] ABSTRACT

Liquid waste material, particularly material containing sulfuric acid, may be combusted using an oxygen-rich material by a process in which:

(i) a primary oxidant and fuel issuing from a burner are combusted in a furnace, the proportion of primary oxidant to fuel being such that there is insufficient oxygen to combust the fuel completely;

(ii) introducing into the furnace the liquid waste material in atomized form around the burner;

(iii) introducing into the furnace spaced from the burner a secondary oxidant which contains sufficient oxygen to combust completely the fuel not combusted by the primary oxidant the direction in which each of the primary oxidant, fuel and liquid waste material is introduced being such that the substances flow in substantially the same direction, the rate at which the primary oxidant, fuel, liquid waste material and secondary oxidant are introduced being such that a plug flow of substances through the furnace is created.

30 Claims, 1 Drawing Sheet

TREATMENT OF LIQUID WASTE MATERIAL

The present invention relates generally to a method and apparatus for treating liquid waste material by combustion. More particularly, the present invention relates to a method for treating contaminated acid, especially contaminated sulfuric acid, by the application of heat to thermally and oxidatively dissociate the acid.

The production of waste by-product materials is a common problem with many industrial processes. For example contaminated or spent acid is produced in the course of a number of industrial processes. Particular mention may be made of contaminated sulfuric acid which is produced in large quantities during the manufacture of methyl methacrylate by the so-called ACH process.

The sulfuric acid which is generated during the production of methyl methacrylate by the ACH process is contaminated with water, ammonium sulphate, ammonium bisulfate and various organic species. The treatment of such waste sulfuric acid by combustion has been described in various patents, especially when the furnace is part of a sulfuric acid recovery facility.

In one such sulfuric acid recovery facility, the contaminated sulfuric acid is introduced into a furnace along with fuel. The fuel/air mixture is combusted to generate the necessary heat to both vaporize the contaminated sulfuric acid and dissociate the acid and its associated contaminants to form water, carbon dioxide and sulfur dioxide. These gaseous combustion products, together with the nitrogen contained in the air, exit the furnace and are passed firstly through a waste heat boiler to recover waste heat and then through a gas cleaning unit to remove water. Following water removal, the gas stream containing the sulphur dioxide is passed through a catalytic converter where the sulphur dioxide is reacted with oxygen to produce sulphur trioxide. The resulting product is then passed through an absorption tower in which the sulphur trioxide is reacted with water to produce sulfuric acid and/or oleum by the contact process.

However, the use of air to support the combustion process carries with it certain problems. The inert gases (predominantly nitrogen) contained in air contribute significantly to the heat load, since they must also be heated to the appropriate temperature in the combustion process. In effect, a significant proportion of the heat generated in the combustion of the fuel is wasted by having to heat up the inerts contained in the air. In consequence, air burners are significantly less thermally efficient. Furthermore, where the furnace is part of a unit dedicated to sulfuric acid recovery (hereinafter SAR), the inerts in the air dilute the concentration of sulfur dioxide in the converter (where sulphur dioxide is reacted with oxygen to form sulfur trioxide) thereby limiting the conversion dioxide to sulphur trioxide. The inerts also reduce the residence time of the reactants in the converter, for a given throughput rate, making it necessary to use large volumes of catalyst to implement the desired reaction. A further problem with SAR plants in which the furnace utilizes air to support the combustion is that the processing rate of the furnace is less than the processing rate of the gas cleaning and the converter units. Moreover, the heat generated within the furnace may not effectively vaporize and dissociate sufficient sulfuric acid to produce an adequate concentration of sulphur dioxide for effective downstream treatment. In such circumstances, additional sulfur may need to be supplied to the furnace and combusted in order to generate additional sulphur dioxide. This contributes significantly to the cost of the SAR treatment.

In general, using air as the oxidizing medium necessitates the use of a large furnace, and as the inerts contained in the air are carried forward into the subsequent stages of the SAR process, large equipment sizes are needed here too, together with a large turbine compressor to draw the product gases generated in the furnace through the various stages of the process with consequent large usage of energy.

The use of oxygen or oxygen enriched air in place of normal air as the oxidant in the combustion process has been proposed. This substitution carries with it distinct advantages, notable among which is the fact that reduced amounts of nitrogen are introduced into the furnace, or else the introduction of nitrogen is avoided altogether. As a result the throughput of the furnace and of the SAR plant in which the furnace is incorporated can be significantly increased. The use of oxygen or oxygen enriched air also reduces, substantially, the amount of fuel which is consumed for processing a given quantity of liquid waste material, since the fuel wastage which occurs through heating the large quantities of inert gases contained in normal air is reduced or even eliminated. Furthermore, the reduction in the quantity of inert gases fed through the SAR plant when oxygen or oxygen enriched air is used in the combustion enables significant savings to be made with regard to the amount of electrical energy used to drive the plant compressor. The use of oxygen or oxygen enriched air also causes the fuel to burn more intensely thus producing a hotter flame which is capable of converting the liquid waste material to end products, e.g., sulfuric acid to sulphur dioxide, at a higher rate. Moreover, where the liquid waste material is spent sulfuric acid, a higher flame temperature tends to reduce the formation of unwanted sulphur trioxide in the furnace.

In summary, major savings in energy usage and fuel consumption are attainable when oxygen or oxygen enriched air is used to support combustion in the furnace and, moreover, when such a furnace is part of an SAR plant, the size of the plant equipment can be reduced without reducing the processing capacity of the plant opposite a larger plant in which normal air is used in the combustion.

However, major problems arise when oxygen or oxygen enriched air feeds are used to support the combustion because the fuel burns more intensely resulting in a significantly increased flame temperature over that produced with air supported combustion. The increased flame temperatures lead to uneven heat distribution and localized hot spots within the furnace which together with the intensity of the heat reduce the equipment life, in particular the life of the refractory material lining the furnace wall. Moreover, the higher temperatures tend to result in the production of nitrogen oxides ($NO_x$) in unacceptable quantities.

U.S. Pat. No. 4,490,347 discloses a process for regenerating spent sulfuric acid in which oxygen enriched air is fed to the furnace. However, it is taught therein that the degree of enrichment of the air with oxygen has practical limitations owing to the difficulties which are encountered in attaining efficient combustion, long equipment life and avoiding explosions. As a result, the teaching in U.S. Pat. No. 4,490,347 is limited to the use of oxygen enriched air streams containing up to 40% oxygen.

U.S. Pat. No. 5,022,332 also discloses a process for regenerating contaminated or spent sulfuric acid in which oxygen or oxygen enriched air feeds are used, and proposes a solution to the problems which result when such feeds are employed. The solution proposed involves inducing a recirculation flow within the furnace by injecting the oxidant (i.e. oxygen or oxygen enriched air) into the furnace at high velocity. The products of the combustion process are entrained within the recirculation flow and are recirculated into the combustion zone where they dilute the combustion reaction of the oxidant and fuel and so reduce the peak flame temperature. The solution proposed in U.S. Pat. No. 5,022,332 is said to allow the use of pure oxygen feeds in the combustion process.

However, the generated recirculation referred to in U.S. Pat. No. 5,022,332 is related to the momentum of the injected oxidant. In the case of a low production regime, the recirculation rate may become insufficient to reduce the peak flame temperature, so resulting in the production of unacceptable levels of $NO_x$ and creating potential hot-spots on the reactor wall which may significantly reduce the life of the refractory lining.

We have now devised a method for treating liquid waste materials by combustion in which oxygen enriched air containing at least 40% v/v oxygen or substantially pure oxygen may be used as the oxidant. The process does not tend to suffer from the drawbacks discussed above and, moreover, can be operated at high turndown to process smaller quantities of the liquid waste.

According to a first aspect of the present invention there is provided a process for treating liquid waste material by combustion thereof in a furnace to produce a flow of combustion gas which is substantially free of liquid waste material at an exit from the furnace, which process comprises:

(a) supplying to the furnace through at least one burner located in an end wall thereof a flow of a primary oxidant which issues from the at least one burner in a first flow direction and which contains at least 22% vol/vol of oxygen, together with a flow of fuel which issues from the at least one burner in a second flow direction which is substantially the same as the first flow direction;

(b) combusting the fuel so as to produce a source of heat;

(c) controlling the primary oxidant to fuel ratio such that the flow of primary oxidant provides insufficient oxygen to effect complete combustion of the fuel;

(d) supplying a flow of liquid waste material to the furnace through a plurality of atomizing lances such that the liquid waste material issues from the atomizing lances in a third flow direction in the form of atomized jets, the atomizing lances being arranged in the end wall around the at least one burner such that the third flow direction is substantially the same as that of the first and second flow directions; and (e) supplying a flow of secondary oxidant, which contains at least 22% vol/vol of oxygen, to the furnace through a plurality of oxidant lances spaced from the at least one burner so as to supplement the flow of primary oxidant and thereby providing sufficient oxygen to effect complete combustion of the fuel, and wherein the flows are supplied to the furnace at such rates and positions that a plug flow of material through the furnace from the end wall to the exit is created.

According to a second aspect of the present invention there is provided a furnace, suitable for carrying out the process as described above, which is connected to a supply of fuel, a supply of primary oxidant and a supply of secondary oxidant, which furnace comprises an end wall, a plurality of oxidant lances, an exit and a control system and wherein (a) the end wall has located therein at least one burner, and a plurality of atomizing lances disposed around the at least one burner;

(b) the at least one burner is connected to the supply of fuel and the supply of primary oxidant and is capable in use of directing a flow of fuel in a first direction and a flow of primary oxidant in a second direction which is substantially the same as the first direction;

(c) the plurality of atomizing jets is connected to the supply of liquid waste material and is capable in use of forming a flow of liquid waste material into atomized jets and directing the atomized jets along a third flow direction which is substantially the same as the first and second flow directions;

(d) the plurality of oxidant lances is connected to the supply of secondary oxidant and is spaced from the at least one burner; and (e) the control system is capable of adjusting the rates at which the fuel, primary oxidant, secondary oxidant and liquid waste material are supplied to the furnace so that in use the flow of primary oxidant provides insufficient oxygen to effect complete combustion of the fuel and a plug flow of material from the end wall to the exit is created.

By a plug flow we mean that the passage of material through the furnace to the exit zone thereof is substantially uninterrupted by large recirculations of reactants and reaction products, especially in the first third of the reactor. As a result, the material advancing through the furnace describes an essentially axial flow pattern. The required plug flow can be achieved by positioning the various lances and burners and controlling the velocity of the fluids they inject so that the momentum associated with the different injected fluids is distributed essentially uniformly across the reactor cross-section. The injection velocities of the various fluids is typically below 100 m/s, preferably below 30 m/s.

The process of the present invention may be usefully employed to process any liquid waste material, but is particularly suitable for processing spent or contaminated acid and especially spent sulfuric acid containing water, ammonium sulphate, ammonium bisulfate and various organic species as contaminants. When the present process is used to process spent sulfuric acid, low $NO_x$ formation and low formation of unwanted sulphur trioxide are attainable. Furthermore, the configuration of acid spray lances and the burners is such that the refractory furnace lining is protected from the direct heat of the flame and is therefore maintained at acceptably low temperatures.

Accordingly, in a preferred embodiment of the present invention there is provided a method of treating contaminated sulfuric acid by the application of heat to dissociate the acid. The furnace which is employed to carry out the method of the invention is preferably part of an SAR facility.

The furnace in which the liquid waste material is combusted is lined with a refractory material which protects the outer wall from the intense heat. The furnace can be disposed with its main axis either vertical or horizontal, but the latter is generally preferred. Conveniently, the furnace is a brick lined cylinder.

The furnace is equipped with one or more burners which supply both primary oxidant and combustible fuel to the furnace. The (or each) burner extends through the end wall of the furnace and is preferably arranged with its axis substantially parallel to the main axis of the furnace. Preferably, the burner(s) are positioned towards the centre of the furnace end wall, at or around the main axis of the furnace. With this configuration the heating of the furnace side wall is minimized. The burner(s) will usually comprise at least two passages for supplying the primary oxidant and the fuel respectively. A preferred burner comprises a central passage which is in communication with a first inlet and an outer annular passage which is in communication with a second inlet. The fuel and the primary oxidant may be supplied to the furnace via the inner and outer passages of the burner respectively. However, for reasons explained hereinafter, the fuel is preferably supplied to the outer passage of such a burner and the primary oxidant to the inner passage thereof. A particularly preferred burner comprises a central passage, an intermediary annular passage and an outer annular passage. With such a burner, the central and outer annular passages are for injection of the fuel and the intermediary annular passage is for injection of the primary oxidant. Normally, between 10 and 30%, e.g. 20%, of the total fuel flow is supplied through the central passage. The injection of oxidant as well as fuel through the burner tends to provide for increased flame stability.

The burner(s) must be able to withstand the high temperatures which are generated in the furnace and for this reason ceramic materials are preferred for the fabrication thereof.

Although the furnace may and usually does comprise more than one burner, the number of burners should not be excessive. Conveniently, the furnace will comprise three burners positioned towards the centre of the furnace end wall around the main axis of the reactor. Preferably, the burners are evenly spaced from the main axis of the furnace and equidistant with respect to one another.

The fuel supplied to the burners may be a liquid or a gaseous fuel. Suitable fuels therefore include fuel oil, propane and natural gas. A particularly preferred fuel is natural gas.

Ignition of the burners is conveniently achieved by means of a pilot flame or a piezoelectric spark.

The primary oxidant and combustible fuel which are supplied to the furnace through the one or more burners create one or several combustion zones, referred to hereinafter as the primary combustion zone. The primary combustion zone is the hottest region in the furnace generating the heat necessary to vaporize and dissociate the liquid waste material.

The amount of primary oxidant which is fed through the burners is below that which is necessary to effect complete combustion of the injected fuel. Specifically, the fuel:primary oxidant ratio is such that insufficient oxygen is provided by the primary oxidant to effect complete combustion of the fuel. Operating the burners sub-stoichiometrically with respect to oxygen tends to ameliorate the risk of explosions which may otherwise occur. Furthermore, when the process of the invention is used to process spent sulfuric acid, the control of the fuel:primary oxidant ratio so as to operate the burners sub-stoichiometrically with respect to oxygen, not only limits the peak flame temperature, but creates a reducing flame which helps to reduce the formation of unwanted $NO_x$. This latter effect may be reinforced by the use of a burner or burners which comprise an inner passage through which the primary oxidant is fed and an outer annular passage through which the fuel, or at least a substantial proportion thereof, is fed. The fuel exiting the burner tends to surround the primary oxidant flow, so increasing the concentration of reducing gases in the periphery of the primary combustion zone.

The primary oxidant which is fed to the burner may be any oxygen rich gas, but is preferably oxygen enriched air or substantially pure oxygen. The primary oxidant should have an oxygen concentration of at least 22% by volume, for example from 22 to 66% by volume. Thus, for example, where the primary oxidant contains a mixture of oxygen and nitrogen, the oxygen content when expressed as a percentage ratio of the volume of oxygen to the total volume of oxygen and nitrogen should be at least 22%. Preferably the primary oxidant should have an oxygen content of at least 40% by volume, for example of at least 66% by volume, and in particularly preferred embodiments will have an oxygen concentration in excess and especially considerably in excess of this value, e.g. at least 90% by volume. Substantially pure oxygen having an oxygen concentration of at least 99.5% by volume is particularly preferred for use as the primary oxidant.

As explained above, the amount of primary oxidant which is fed through the burner(s) is such that the oxygen it provides is below that which is necessary to effect complete combustion of the injected fuel. The primary oxidant:fuel ratio will depend, of course, on the oxygen concentration of the primary oxidant and may also vary depending on the nature of the liquid waste material which is being processed. In general, the oxygen provided by the primary oxidant will be between 50 and 99.9% of the stoichiometric requirement. When the process of the present invention is used to treat spent or contaminated sulfuric acid, the oxygen supplied in the primary oxidant flow will preferably provide between 80 and 95% of the stoichiometric requirement; at or around 80% of the stoichiometric requirement being especially preferred.

In the process of the invention, atomized jets of liquid waste material are supplied to the furnace through a plurality of lances fitted with atomizing nozzles. The atomizing lances are mounted in the same end wall of the furnace as the burner(s) and are positioned around the burner(s) (i.e. between the burner(s) and the furnace side wall). The orientation of the atomizing lances is such that the liquid waste material is injected along the furnace in a flow direction which is substantially the same as that of the primary oxidant and fuel. In practice, this means that the atomizing lances are arranged with their axes substantially parallel to the main axis of the furnace.

The atomizing lances create a curtain or veil of liquid waste spray which tends to shield or protect the furnace side wall, particularly in the region of the burner, from the direct heat of the flame. In consequence, the furnace wall temperature can be maintained below that at which the furnace lining is damaged. For example, for a furnace lining made of refractory bricks containing 65% alumina, it is important to maintain the temperature thereof below 1400° C. With the process of the present invention, the shielding effect of the liquid waste sprays enables furnace wall temperatures considerably below 1400° C. to be achieved, e.g. between 1000° and 1250° C.

Directing the liquid waste material around the burners may also provide certain other advantages. For example, the problem of flame instability which can arise when the liquid waste material is injected directly into the flame may be overcome. Furthermore, in relation to the processing of spent sulfuric acid, the unwanted $NO_x$ tend to form in the hotter regions of the furnace. Thus, when the spent sulfuric acid is sprayed directly into the hot flame, unacceptable levels of $NO_x$ tend to be produced. In contrast, by spraying the spent sulfuric acid around the burners, only low levels of $NO^x$ tend to be formed, since direct contact between the injected acid and the hot flame issuing from the burner(s) is substantially avoided. In effect, the acid is injected into the hot zone surrounding the flame and is there subjected to the less intense heat which radiates or is otherwise transmitted from the flame. Moreover, directing the spent sulfuric acid around the burners may also inhibit the formation of unwanted sulphur trioxide.

Preferably, the atomizing lances are uniformly or evenly distributed in the furnace, e.g. they may be evenly spaced from the main axis of the furnace and equidistant with respect to one another. The number of atomizing lances distributed around the burners should, of course, be sufficient to create the necessary thermal shield between the primary combustion zone and the furnace side wall. Preferably, the distance between each atomizing lance should be such as to avoid substantial interaction and coalescence between neighboring liquid waste sprays.

Effective atomization of the liquid waste material is important for efficient combustion. For example, when the process of the invention is used to process spent sulfuric acid, the degree of atomization will effect the conversion of the spent acid to the desired sulphur dioxide. In practice, the droplets of liquid waste material generated in the atomization should be small enough so that within their residence time in the furnace the liquid waste material can be both vaporized and fully decomposed. In the case of spent sulfuric acid, this means that the droplets should be small enough to allow for the complete thermal and oxidative decomposition of the sulfuric acid, ammonium sulphate and ammonium bisulfate during that residence time. The optimum size of the droplets may, of course, vary depending on the nature of the liquid waste material being combusted. However, in the case of spent sulfuric acid, the atomization preferably results in droplets having a size below 500 µm. If the droplets produced have a size above 500 µm, then not only incomplete combustion, but also damage to the refractory lining owing to condensation of the acid thereon may result.

Atomization of the liquid waste material may be effected using in-line or right angled atomization lances. Both of these lances terminate in an atomizing nozzle and comprise a first passage or conduit for feeding liquid waste material and a second passage or conduit for feeding the atomizing gas to the nozzle.

Although any gas may be usefully employed to atomize the liquid waste material, air is often preferred in view of its availability. When air is used as the atomizing medium, its effect on the overall oxygen balance may need to be taken into account, since it may have a crucial bearing on the efficacy of the combustion process (see hereinafter). However, we do not exclude the possibility that oxygen or oxygen enriched air may be used to atomize the liquid waste material, in which case the atomizing gas may also constitute the secondary oxidant flow. Preferably, however, air is used to produce the atomized sprays and the secondary oxidant flow is supplied to the furnace via separate lances.

In the process of the invention, atomized liquid waste material may additionally be provided in other positions along the furnace. For example, the furnace may also comprise atomizing lances mounted in the side wall thereof. A particularly suitable furnace for use in the present invention comprises (a) the essential primary set of atomizing lances which are arranged in the furnace end wall around the burner and supply atomized jets of liquid waste material in a flow direction which is substantially the same as that of the primary oxidant and fuel; and (b) one or more secondary sets of atomizing lances which are spaced from the burner and mounted in the side wall of the furnace.

In the process of the invention, the deficit of oxygen in the primary oxidant flow is supplemented by supplying a secondary oxidant flow to the furnace through lances spaced from the burner(s). Separate lances are normally provided for this purpose, and these are preferably located in the same end wall of the furnace as the burner(s) and particularly preferably, are positioned around the burner(s) between the burner(s) and the liquid waste injecting atomizing lances. The orientation of the lances supplying the secondary oxidant is preferably such that the oxidant is injected into the furnace in a flow direction which is substantially the same as that of the primary oxidant and fuel. In practice, this means that the lances supplying the secondary oxidant are arranged with their axes substantially parallel to the main axis of the furnace. Preferably, the lances supplying the secondary oxidant are evenly spaced from the main axis of the furnace and the equidistant with respect to one another.

The amount of secondary oxidant which is supplied in the process of the invention should be at least sufficient to make up the oxygen deficit, taking into account any oxygen which may be supplied with the atomizing gas, and therefore provide sufficient oxygen overall to effect complete combustion of the fuel and any combustible species, e.g. organic species, present in the liquid waste material. However, depending on the liquid waste to be incinerated, it may be desirable to control the injection of the secondary oxidant so that the oxygen supplied to the furnace in the primary and secondary oxidant flows and the atomizing air (where used) is in excess of stoichiometric requirements. The combustion of spent sulfuric acid is an example of such a process, when the stoichiometric excess of oxygen is preferably controlled such that the combustion gases existing the furnace contain from 1 to 4% by volume of oxygen on a dry gas basis. This control over the oxygen excess may be effected by monitoring the concentration of oxygen in the combustion gases exiting the furnace and adjusting the secondary oxidant flow rate as appropriate so as to keep the oxygen concentration within the desired range. In the combustion of spent sulfuric acid, it is desirable to maintain an oxygen excess in order to avoid the deposition of sulphur and the formation of hydrogen sulphide. However, the oxygen excess should not be so great that unwanted $NO_x$ and sulphur trioxide are formed in large quantities. The 1 to 4% by volume range discussed above limits the formation of unwanted $NO_x$ and sulphur trioxide while leaving a safe margin of operation above stoichiometric requirements.

The secondary oxidant may be any oxygen rich gas, but is preferably oxygen enriched air or substantially pure oxygen. The primary oxidant should have an oxygen concentration of at least 22% by volume, for example from 22 to 66% by volume. Thus, for example, where the primary oxidant contains a mixture of oxygen and nitrogen, the oxygen content when expressed as a percentage ratio of the volume of oxygen to the total volume of oxygen and nitrogen should be at least 22%. Preferably the primary oxidant should have an oxygen content of at least 40% by volume, for example of at least 66% by volume, and in particularly preferred embodiments will have any oxygen concentration in excess and especially considerably in excess of this value, e.g. at least 90% by volume. Substantially pure oxygen having an oxygen concentration of at least 99.5% by volume is particularly preferred for use as the secondary oxidant, since this avoids feeding redundant gases such as nitrogen to the furnace.

Without wishing to be bound by any theory, it is believed that the injection of the secondary oxidant flow creates a secondary combustion zone in which any combustible species present in the liquid waste material such as organic species are combusted.

Where the liquid waste material to be processed is spent sulfuric acid, liquid sulfur may also be supplied to the furnace via one or more lances in order to generate additional sulfur dioxide.

The temperature at which the furnace is operated may be controlled and so maintained within a temperature range which is suitable for treating a given liquid waste material, but below the maximum operating temperature of the furnace lining.

When the liquid waste material being treated is spent sulfuric acid, the furnace temperature is preferably maintained in the range of from 850° to 1200° C. If the furnace temperature is below 850° C., incomplete combustion tends to result leading to high levels of unreacted ammonium sulfate and the formation of unacceptable levels of sulfur trioxide. Temperatures above 1200° tend to lead to the formation of unacceptable amounts of $NO_x$. More particularly, the operating temperature of the furnace should be maintained in the range of from 1000° to 1100° C., and especially at or around 1050° C.

The desired furnace temperature may be achieved and maintained by exercising control over the rate of supplying fuel relative to the rate of supplying liquid waste material. Thus, if the rate of supplying the liquid waste to the furnace is kept constant, the fuel flow rate can be adjusted as and when the temperature fluctuates from the desired value. This control may be effected by means of a computer system which responds to information relayed from temperature probes positioned in the furnace by adjusting the flow rate of the fuel, e.g. by operating a valve.

The heat generated in the furnace by the combustion of fuel and oxidant vaporizes the liquid waste material and then decomposes that material to produce various oxygen containing combustion products which may be further processed. For example, spent sulfuric acid, which generally contains from 20 to 90 weight % sulfuric acid, and from 10 to 80 weight % contaminants which include one or more hydrocarbons, water, ammonium sulfate and ammonium bisulfate, is decomposed in the furnace to yield sulphur dioxide, carbon dioxide, water and residual amounts of $NO_x$ and perhaps sulphur trioxide. The spent sulfuric acid typically has a resident time in the furnace of from 1 to 6 seconds, preferably of from 2 to 4 seconds. Residence times within these ranges have been found to be sufficient to provide for complete combustion under normal circumstances.

The liquid waste material may be pre-concentrated before it is supplied to the furnace to remove at least a proportion of any water and volatile organics present. Pre-concentration may in particular be preferred when spent sulfuric acid is treated in the furnace.

When the process of the invention is used to treat spent sulfuric acid, the furnace in which the process is effected is normally part of an SAR facility. In such a facility, the gaseous combustion products exiting the furnace are passed to a gas cleaning unit (a scrubber and drier) to remove water. Following water removal, the gas stream containing the sulphur dioxide is passed through a catalytic converter where the sulphur dioxide is reacted with oxygen to produce sulphur trioxide. The resulting product is then passed through an absorption tower in which the sulphur trioxide is reacted to produce sulfuric acid and/or oleum by the contact process. Prior to passage into the gas cleaning unit, the gaseous combustion products may be passed through a waste heat boiler or other heat exchange means to cool the gases and recover waste heat. The steam generated in the waste heat boiler may be used to drive a turbine which in turn drives a compressor or blower which creates the induced draft necessary to draw the gases through the SAR plant. Such an arrangement provides significant savings in the use of electrical energy. Alternatively, the steam produced may be used to drive compressors on an air separation plant.

One type of furnace which may be used to implement the process of the present invention is now described below with reference to the accompanying drawing, in which:

FIG. 1 is a view of the furnace looking down from the exit end thereof to the burner end.

In FIG. 1, the furnace comprises a brick lined cylinder (1) in which is arranged at one end thereof three burners (2), three oxidant lances (3) for injecting a secondary oxidant into the furnace, and five atomizing lances (4) for injecting liquid waste material into the furnace.

The burners (2) extend through the end wall (5) of the furnace and are positioned towards the centre of that wall around the main axis of the furnace. The orientation of the burners (2) is such that their axes are substantially parallel to the main axis of the furnace. The burners comprise an inner passage (2A) and an outer annular passage (2B) for supplying the primary oxidant and the fuel respectively. The three burners (2) are uniformly distributed in the furnace, being essentially equally spaced from the main axis of the furnace and essentially equidistant with respect to one another.

The oxidant lances (3) extend through the end wall (5) of the furnace and are arranged around the burners (2). The orientation of the oxidant lances (3) is such that their axes are substantially parallel to the main axis of the furnace. The oxidant lances (3) are uniformly distributed in the furnace, being essentially equally spaced from the main axis of the furnace and essentially equidistant with respect to one another.

The five atomizing lances (4) extend through the furnace end wall (5) and are arranged around the burners (2). The orientation of the atomizing lances (4) is such that their axes are substantially parallel to the main axis of the furnace. The atomizing lances (4) are substantially uniformly distributed in the furnace, and preferably are essentially equidistant with respect to one another.

The orientation of the burners (2), oxidant lances (3) and atomizing lances (4) is such that they inject their respective fluids along the furnace axis, so that the material advancing through the furnace describes an essentially axial flow pattern. Moreover, the positioning of the burners (2) and lances (3,4) in the furnace is substantially uniform which provides for a plug flow and avoids large recirculations in the furnace.

The present invention is now illustrated but not limited by the following Examples.

In the Examples:

Spent sulfuric acid containing the following components in the amounts shown was treated in accordance with the process of the present invention.

| Component | % by weight |
| --- | --- |
| Sulfuric Acid | 36.60 |
| Ammonium Sulphate | 22.90 |
| Water | 32.74 |
| Ethylene Glycol | 7.76 |

The furnace used was similar to that illustrated in FIG. 1. The main body of the furnace was a brick lined cylinder which was disposed with its main axis substantially horizontal. The furnace was equipped with three oxy-ural gas burners which extended through the end wall of the furnace and were positioned towards the centre of that end wall with their axes substantially parallel to the main axis of the furnace. The burners comprised a central passage for injection of technically pure oxygen and an outer passage for injection of natural gas. Also extending through the furnace and wall were three effluent injectors for supplying the spent sulfuric acid and two oxygen lances for injecting technically pure oxygen. The effluent injectors and the lances surrounded the burners and were arranged substantially parallel to the main axis of the furnace. The effluent injectors terminated in an atomizing nozzle which was designed to create droplets with a size mostly in the range of from 100 to 200 μm. The position of the effluent injectors was such that the spent sulfuric acid they injected formed a curtain of spray which tended to shield the furnace wall from the direct heat of the flames issuing from the burners.

EXAMPLE 1

The furnace described above was used to process spent sulfuric acid which was fed to the burners at a rate of 87.0 liters/hour. Air was used to atomize the sulfuric acid and this was supplied to the effluent injectors at a rate of 15.1 Nm$^3$/hour. Natural gas (containing 97.12% by weight methane, 0.95% by weight ethane, 0.19% by weight propane, 0.15% by weight carbon dioxide and 1.59% by weight nitrogen) and technically pure oxygen were fed to the burners at a rate of 13.13 Nm$^3$/hour and 22.06 Nm$^3$/hour respectively. The burners were thus operated sub-stoichiometrically with the oxygen fed thereto providing 80% of the stoichiometric requirement, i.e., 80% of the total oxygen required to effect complete combustion of the natural gas. Technically pure oxygen was supplied to the oxygen lances at a flow rate of 7.8 Nm$^3$/hour in order to make up the oxygen deficit and provide a stoichiometric excess thereof overall. The temperature of the furnace wall was monitored at various distances from the burners. Temperatures of 969° C., 1047° C. and 1015° C. were recorded at distances of 0.5 m, 1.5 m and 2.0 m from the burners respectively. The temperature of the hot gases leaving the furnace was also monitored and was found to be 1040° C. These hot gases were also analyzed and were found to contain, on a dry gas basis, 2% by volume oxygen, 33% by volume carbon dioxide, 24.13% by volume sulphur dioxide and 50 ppm of nitrogen oxides, with nitrogen making up the balance.

EXAMPLE 2

The furnace described above was used to process spent sulfuric acid which was fed to the burners at a rate of 87.0 liters/hour. Air was used to atomize the sulfuric acid and this was supplied to the effluent injectors at a rate of 15.1 Nm$^3$/hour. Natural gas (containing 97.12% by weight methane, 0.95% by weight ethane, 0.19% by weight propane, 0.15% by weight carbon dioxide and 1.59% by weight nitrogen) and technically pure oxygen were fed to the burners at a rate of 14.27 Nm$^3$/hour and 20.98 Nm$^3$/hour respectively. The burners were thus operated sub-stoichiometrically with the oxygen fed thereto providing 70% of the stoichiometric requirement, i.e. 70% of the total oxygen required to effect complete combustion of the natural gas. Technically pure oxygen was supplied to the oxygen lances at a flow rate of 12.5 Mn$^3$/hour in order to make up the oxygen deficit and provide a stoichiometric excess thereof overall. The temperature of the furnace wall was monitored at various distances from the burners Temperatures of 990° C. 1039° C. and 1020° C. were recorded at distances of 0.5 m, 1.5 m and 2.0 m from the burners respectively. The temperature of the hot gases leaving the furnace was also monitored and was found to be 1035° C. These hot gases were also analyzed and were found to contain, on a dry gas basis, 2.1% by volume oxygen, 36.0% by volume carbon dioxide, 25.55% by volume sulphur dioxide and 60 ppm of nitrogen oxides, with nitrogen making up the balance.

We claim:

1. A process for treating liquid waste material by combustion in a furnace whereby said liquid waste material is vaporized and decomposed to produce a flow of combustion gas which is substantially free of liquid waste material at an exit from the furnace, which process comprises: (a) supplying to the furnace through at least one burner located in an end wall thereof a flow of a primary oxidant which issues from the at least one burner in a first flow direction and which contains at least 22% by volume of oxygen, together with a flow of fuel which issues from the at least one burner in a second flow direction which is substantially the same as the first flow direction;

(b) combusting the fuel so as to produce a source of heat;

(c) controlling the primary oxidant to fuel ratio such that the flow of primary oxidant provides insufficient oxygen to effect complete combustion of the fuel;

(d) supplying a flow of liquid waste material to the furnace through a plurality of atomizing lances such that the liquid waste material issues from the atomizing lances in a third flow direction in the form of atomized jets, the atomizing lances being arranged in the end wall around the at least one burner such that the third flow direction is substantially the same as that of the first and second flow directions; and (e) supplying a flow of secondary oxidant, which contains at least 22% by volume of oxygen, to the furnace through a plurality of oxidant lances spaced from the at least one burner so as to supplement the flow of primary oxidant and thereby providing sufficient oxygen to effect complete combustion of the fuel, and wherein the flows are supplied to the furnace at such rates and positions that a plug flow of material through the furnace from the end wall to the exit is created, whereby said liquid waste material is vaporized and decomposed.

2. A process as claimed in claim 1 wherein the flows issue into the furnace at an injection velocity of less than 100 m/s.

3. A process as claimed in claim 1 wherein the at least one burner comprises a central passage which is in communication with a first inlet and an outer annular passage which is in communication with a second inlet.

4. A process as claimed in claim 3 wherein the at least one burner comprises a central passage, an intermediary annular passage and an outer annular passage and the flow of fuel passes through the central and outer annular passages into the furnace and the flow of primary oxidant passes through the intermediary annular passage into the furnace.

5. A process as claimed in claim 4 wherein from 10 to 30% of the flow of fuel passes through the central passage.

6. A process as claimed in claim 1 wherein the fuel is selected from fuel oil, propane and natural gas.

7. A process as claimed in claim 1 wherein the atomizing lances are supplied with a flow of an atomizing gas which is used to atomize the liquid waste material.

8. A process as claimed in claim 7 wherein the atomizing gas is air.

9. A process as claimed in claim 1 wherein the secondary oxidant issues from the oxidant lances into the furnace in a fourth flow direction which is substantially the same as the first and second flow directions.

10. A process as claimed in claim 1 wherein the flows of the primary and secondary oxidants and, when used, the atomizing gas provides a quantity of oxygen which is in excess of the stoichiometric amount required to effect complete combustion of the fuel.

11. A process as claimed in claim 1 wherein the liquid waste material is spent sulfuric acid containing from 20 to 90 weight % sulfuric acid, and from 10 to 80 weight % contaminants and the heat released by the combustion of the fuel is used to dissociate the sulfuric acid to produce a combustion gas which contains sulphur dioxide.

12. A process as claimed in claim 11 wherein the spent sulfuric acid is atomized within the furnace into droplets having a size below 500 μm.

13. A process as claimed in claim 11 wherein the spent sulfuric acid has a residence time in the furnace of from 1 to 6 seconds.

14. A process as claimed in claim 11 wherein the combustion gas exiting the furnace contain from 1 to 4% by volume of oxygen on a dry gas basis.

15. A process as claimed in claim 11 further comprising supplying a flow of liquid sulphur to the furnace through at least one lance.

16. A process as claimed in claim 11 further comprising a series of recovery stages wherein
   (i) the combustion gas exiting the furnace is passed through a gas cleaning unit to remove water to produce a dried gas stream;
   (ii) the dried gas stream is passed through a catalytic converter to catalytically react the sulphur dioxide with oxygen in a catalytic converter to produce a sulphur trioxide laden stream; and
   (iii) the sulphur trioxide laden stream is passed through a contact process to produce sulfuric acid and/or oleum.

17. A process as claimed in claim 16 wherein the combustion gas is subjected to indirect heat exchange prior to passage thereof through the gas cleaning unit, thereby recovering waste heat.

18. A process as claimed in claim 17 wherein the waste heat is used to generate steam, which is then used to provide shaft power.

19. A process as claimed in claim 1 wherein the primary or secondary oxidant has an oxygen content in the range 22 to 66% by volume.

20. A process as claimed in claim 1 wherein the primary or secondary oxidant has an oxygen content of at least 40% by volume.

21. A process as claimed in claim 20 wherein the primary or secondary oxidant has an oxygen content of at least 66% by volume.

22. A furnace suitable for carrying out the process as claimed in claim 1 which is connected to a supply of fuel, a supply of primary oxidant and a supply of secondary oxidant, which furnace comprises an end wall, a plurality of oxidant lances, an exit and a control system and wherein (a) the end wall has located therein at least one burner, and a plurality of atomizing lances disposed around the at least one burner;

(b) the at least one burner is connected to the supply of fuel and the supply of primary oxidant and is capable in use of directing a flow of fuel in a first direction and a flow of primary oxidant in a second direction which is substantially the same as the first direction;

(c) the plurality of atomizing jets is connected to the supply of liquid waste material and is capable in use of forming a flow of liquid waste material into atomized jets and directing the atomized Jets along a third flow direction which is substantially the same as the first and second flow directions;

(d) the plurality of oxidant lances is connected to the supply of secondary oxidant and is spaced from the at least one burner; and (e) the control system is capable of adjusting the rates at which the fuel, primary oxidant, secondary oxidant and liquid waste material are supplied to the furnace so that in use the flow of primary oxidant provides insufficient oxygen to effect complete combustion of the fuel, the flow of secondary oxidant supplements the flow of primary oxidant to provide sufficient oxygen to effect complete combustion of the fuel and a plug flow of material from the end wall to the exit is created.

23. A furnace as claimed in claim 22 having a horizontal main axis.

24. A furnace as claimed in claim 23 wherein the at least one burner is positioned towards the centre of the end wall, at or around the main axis of the furnace.

25. A furnace as claimed in claim 24 comprising three burners.

26. A furnace as claimed in claim 25 wherein the burners are evenly spaced from the main axis of the furnace and equidistant with respect to one another.

27. A furnace as claimed in claim 23 wherein each of the plurality of atomizing lances is arranged with its axis substantially parallel to the main axis of the furnace.

28. A furnace as claimed in claim 22 wherein the plurality of oxidant lances are located in the end wall of the furnace.

29. A furnace as claimed in claim 28 wherein the plurality of oxidant lances are positioned around the at least one burner, and between the at least one burner and the plurality of atomizing lances.

30. A furnace as claimed in claim 29 wherein each of the plurality of oxidant lances is evenly spaced from the main axis of the furnace and equidistant with respect to one another.

* * * * *